C. HENNESSEE.
COMBINED SEEDER AND GUANO DISTRIBUTER.
APPLICATION FILED APR. 11, 1914.
1,124,616.
Patented Jan. 12, 1915.
2 SHEETS—SHEET 1.
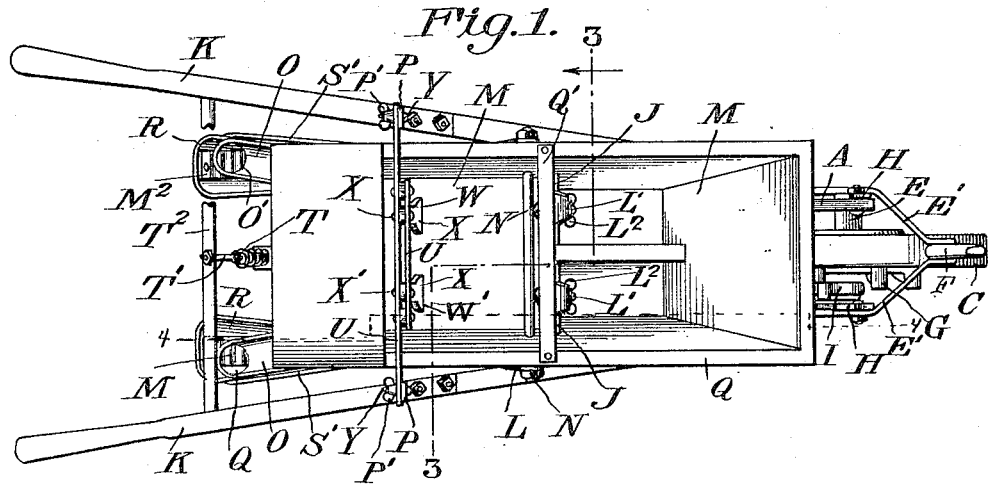
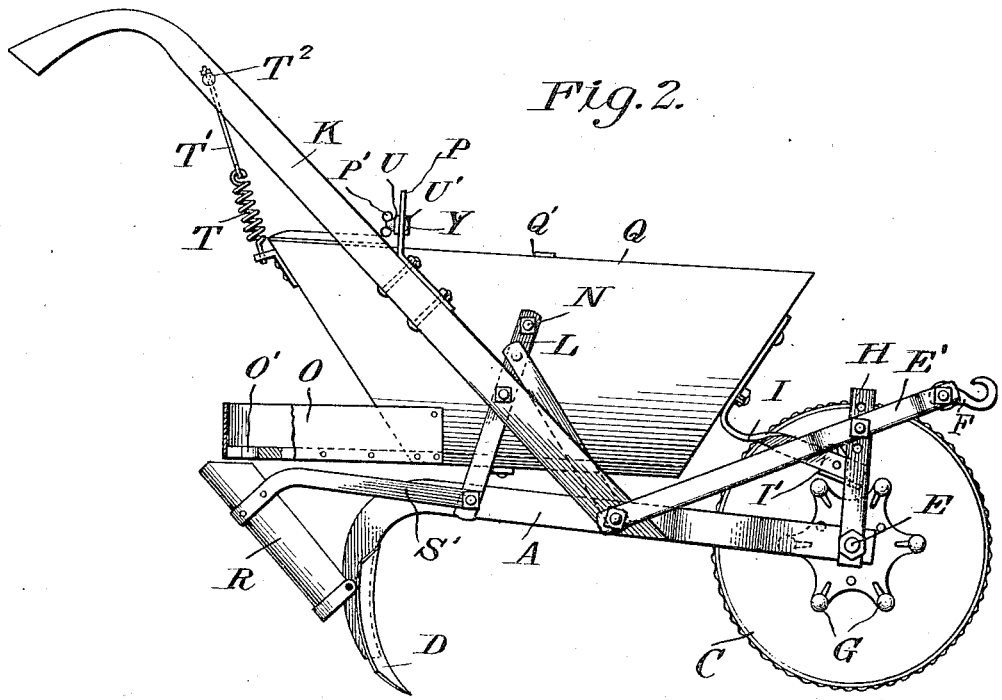
Witnesses
Fenton S. Belt
A. R. Fowler
Inventor
Claude Hennessee
By Franklin N. Hough
Attorney C. HENNESSEE.
COMBINED SEEDER AND GUANO DISTRIBUTER.
APPLICATION FILED APR. 11, 1914.
1,124,616.
Patented Jan. 12, 1915.
2 SHEETS—SHEET 2.
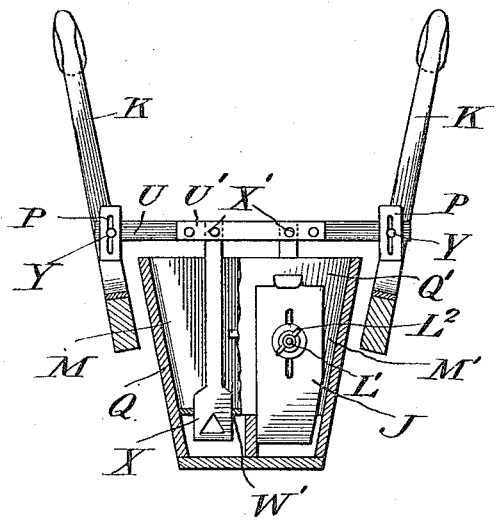
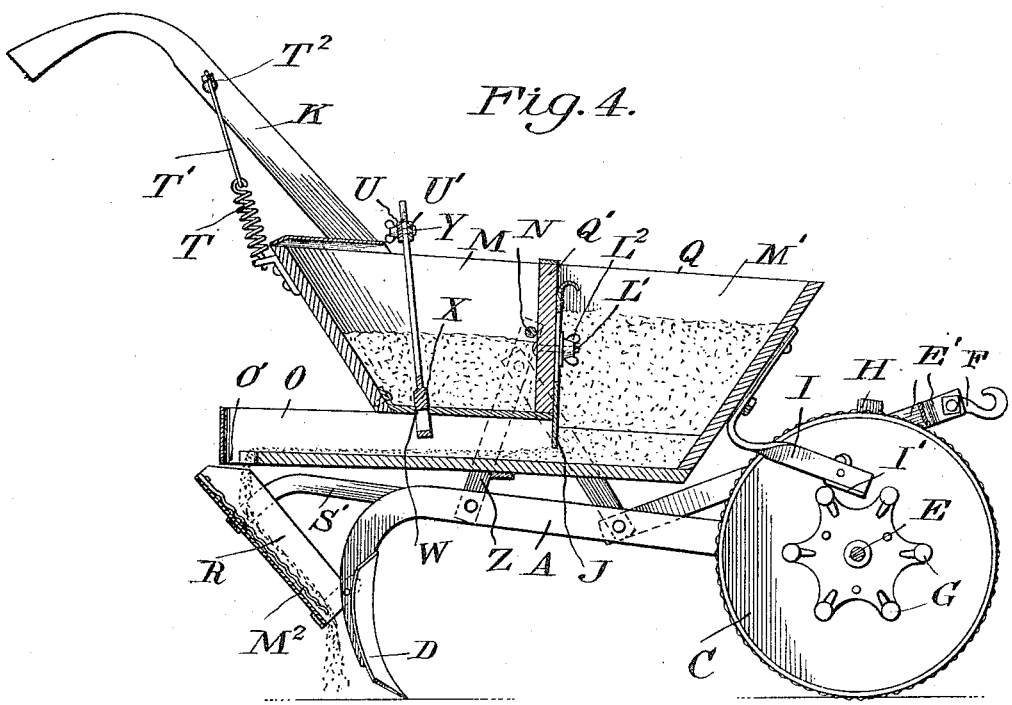

UNITED STATES PATENT OFFICE.

CLAUDE HENNESSEE, OF ATLANTA, GEORGIA.

COMBINED SEEDER AND GUANO-DISTRIBUTER.

1,124,616.  Specification of Letters Patent.  Patented Jan. 12, 1915.

Application filed April 11, 1914. Serial No. 831,324.

*To all whom it may concern:*

Be it known that I, CLAUDE HENNESSEE, a citizen of the United States, residing at Atlanta, in the county of Fulton and State of Georgia, have invented certain new and useful Improvements in Combined Seeders and Guano-Distributers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combined guano distributers and seeders and comprises essentially a tilting receptacle so arranged that the seed may be forced through apertures in the bottom of the seed receptacle by the tilting of the latter, the seed and guano mixing together before being dispensed through suitable vibrating troughs or passageways.

The invention comprises various details of construction, combinations and arrangements of parts, which will be hereinafter fully described, shown in the accompanying drawings and then specifically defined in the appended claims.

I illustrate my invention in the accompanying drawings, in which:

Figure 1 is a top plan view of a combined guano distributer and seeder made in accordance with my invention. Fig. 2 is a side elevation. Fig. 3 is a cross sectional view on line 3—3 of Fig. 1, and Fig. 4 is a longitudinal sectional view on line 4—4 of Fig. 1.

Reference now being had to the details of the drawings by letter, A, A designate the beams of the seeder which have cultivator blades D attached thereto, and C is a driving wheel to the axle E of which the forward ends of said beams are connected.

E′ are bars which are fastened to said beam at corresponding ends and their other ends are connected to a lug F to which power is adapted to be connected, said bars being connected to the axle by means of the adjustable links H. Handles K are fastened to said beam and to the bars L, which latter are fastened at their lower ends to said beams and their upper ends carry the pivotal rod N upon which the combined seeder and guano receptacle is pivotally mounted.

The combined seeder and guano receptacle comprises a receptacle Q having a partition Q′ therein dividing the same into two compartments, designated by letters M and M′. The compartment M′ is for the reception of guano and is deeper than the compartment M which is adapted to receive the seed, a passageway being formed underneath the said compartment which is continuous with the bottom of the guano distributer.

Slides, designated by letter J, are mounted upon the bolts L′ passing through slots therein and winged nuts L² serve to hold the slides in different adjusted positions to regulate the feeding of the guano.

Projecting rearward from the space underneath the seed compartment are the passageways O with exit openings O′ therein through which the guano and seed mixed together make exit into the trough-shaped members R which are set at inclinations and fastened to the beams by means of the straps S′.

The driving wheel has a series of lugs G projecting from one face thereof and a bar I is fastened to the forward end of the receptacle and has a laterally projecting portion I′ which is in the path of said lugs and which forms a means for causing the receptacle to tilt upon its pivot to agitate and cause the mixture of guano and seed to pass through the passageways and be distributed. In order to prevent the driving wheel from slipping, its circumference is preferably corrugated or provided with grooves as shown.

A spring, designated by letter T, is fastened at one end to the receptacle and its other end to a link T′ connected to the round T² of the handles, the office of said spring being to tilt the receptacle back to its normal position after having been tilted by said lateral projection coming in contact with one of said lugs.

The bottom of the seed receptacle is provided with two slots, designated by letters W and W′, adapted to receive the forced seed feeding members X, the lower ends of which are provided with inverted V-shaped slots. The upper ends of said feeding members X are pivotally connected to the pins X′ carried by the bars U and U′. The ends of the rods U carry screws Y passing through slots in the bars P which are fastened to the handles, and thumb nuts P' are mounted upon the threaded ends of the bolts and are adapted to hold the bars U and U' in different vertical planes, accordingly as it may be desired to feed more or less seed through the slots in the bottom of the seed receptacle by the tilting of the latter. For instance, if it is desired to feed a considerable amount of seed, the bars U are held at their highest upper limit to allow a considerable amount of seed to pass into the inverted V-shaped space so that, when the receptacle tilts, the seed will be forced through the slots in the bottom and be jarred back by the vibratory movement of the seed receptacle and make exit through the openings in the passageways leading therefrom.

In order to scatter the guano and seed, I provide corrugated plates, designated by letter $M^2$, which are made of a resilient material and vibrate under the jar which is imparted to the same as the apparatus is moved over the ground.

In operation, when the rear end of the seed receptacle tilts down incident to a lug coming in contact with a lateral projection upon the bar which is fastened to the forward end of the receptacle, seed will enter the inverted V-shaped space and, after said lateral projection has passed the lug, the spring will quickly return the receptacle to its normal position, causing the lower ends of said feeding members to pass through the slots and push the seed down into the bottom underneath the seed receptacle. The vibratory movement of the receptacle will advance the guano rearward where it mixes with the seed before making exit.

What I claim to be new is:

1. A combined seeder and guano distributer comprising cultivator beams, a driving wheel journaled therein, lugs projecting from the face of said wheel, handles fastened to said beams, a seed and guano receptacle pivotally mounted upon said beams, a bar fastened to the receptacle and having a lateral projection in the path of said lugs, a spring for returning the receptacle to its normal position, force feeding members movable through slots in the bottom of the receptacle, a bar fastened to said handle and to which said members are connected, as set forth.

2. A combined seeder and guano distributer comprising a frame, a receptacle having compartments therein, one for containing guano and the other seed, a driving wheel, lugs in the face thereof, a bar projecting from the receptacle and in the path of said lugs, handles upon the frame, a bar adjustably mounted upon said handles, force feeding members connected to said adjustable bar and having their lower ends passing through slots in the bottom of the seed receptacle, passageways leading from the bottom of the receptacle and having exit openings, and troughs fastened to the frame adapted to guide the course of the guano and seed, as set forth.

3. A combined seeder and guano distributer comprising a receptacle divided into compartments, a frame and means for vibrating the receptacle, handles fastened to the frame, the bottom of one compartment extending underneath the bottom of the other, an adjustable bar connecting said handles, the feeding members fastened to said bar and having their lower ends recessed and extending through slots in the bottom of one of the compartments, and passageways leading from the bottom of said receptacle and having exit openings therein, as set forth.

4. A combined seeder and guano distributer comprising a frame, a receptacle pivotally mounted thereon and means for tilting the same, said receptacle having a partition dividing the same into two compartments, one for guano and the other for seed, the lower portion of the guano compartment extending underneath the bottom of the seed compartment, slides for regulating the feeding of the guano, handles upon the frame, an adjustable bar connected to said handles, force feeding arms fastened to said bar and having inverted V-shaped recesses formed in their lower ends and passing through slots in the bottom of the seed compartment, rearwardly extending passageways leading from the bottom of the compartment and provided with exit openings, as set forth.

In testimony whereof I hereunto affix my signature in presence of two witnesses.

CLAUDE HENNESSEE.

Witnesses:
R. M. Moss,
P. L. Drummond.

Copies of this patent may be obtained for five cents each, by addressing the "Commissioner of Patents, Washington, D. C."